Aug. 18, 1936.  T. S. LEE  2,051,461
APPARATUS FOR RAISING PLANTS FROM SEED
Filed May 29, 1935
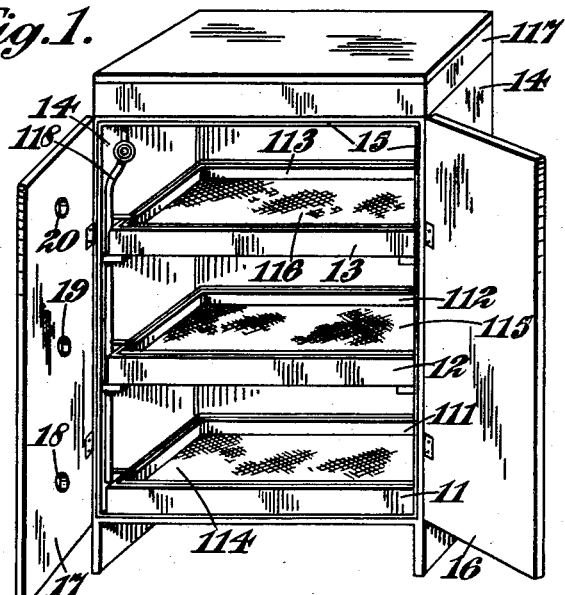
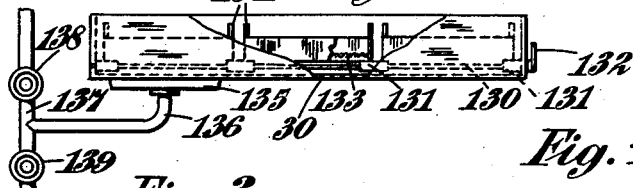
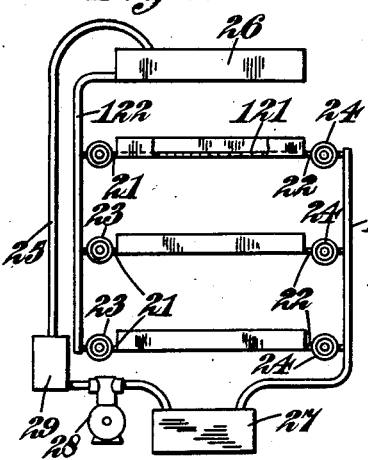
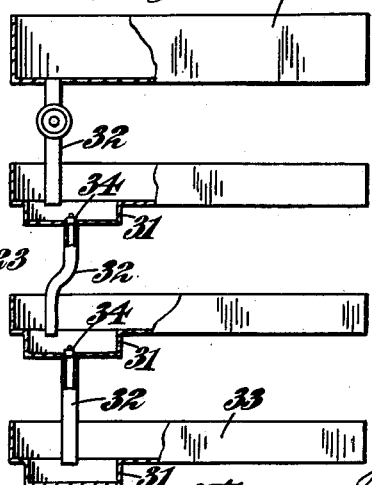
Inventor
Thomas S. Lee
By Watson, Coit, Morse & Grindle
Attorneys Patented Aug. 18, 1936

2,051,461

UNITED STATES PATENT OFFICE 2,051,461

APPARATUS FOR RAISING PLANTS FROM SEED

Thomas Stirling Lee, London, England, assignor to Alfred Wallace Wallace-Turner, London, England Application May 29, 1935, Serial No. 24,106
In Great Britain June 2, 1934

4 Claims. (Cl. 47—16)

This invention is for improvements in or relating to apparatus for raising plants from seed.

It is an object of the present invention to provide apparatus for the rapid raising of plants having a feeding value from seeds with or without soil. Such methods comprise the raising of plants from seed with or without soil by treatment of the seeds with an aqueous liquid having nutrient materials dissolved or suspended therein, the nutrient material including a proportion of a salt of sulphocyanic acid. The salt of sulphocyanic acid may comprise an alkali salt for example the sodium or potassium salt and in one preferred form it may consist of ammonium sulphocyanate.

Among the plants to the raising of which the present apparatus may be applied with advantage may be mentioned cereals such as maize, wheat, oats and barley, papilionaceous plants such as peas and beans, tubers such as potatoes, and plants such as tobacco which are normally difficult to raise in temperate zones.

The present invention consists of apparatus for raising plants from seeds with or without soil which comprises a series of tray-like receptacles to contain feeding liquid, one or more perforated trays in each receptacle to retain the seeds and means for introducing feeding liquid into the receptacle and for withdrawing liquid therefrom. At least one wall of the receptacle may be made double in order to constitute a jacket and there may be provided means for circulating temperature-regulating fluid through said jacket.

The temperature-regulating fluid may consist of liquid or gas and may be circulated by convection. In one simple form of apparatus an oil or other heater within the jacket may constitute both the heating and circulating means, and the temperature may be regulated by means of adjustable air inlet and outlet valves in the jacket. The temperature of the jacket may be maintained constant by means of a simple form of thermostat and this thermostat may be arranged to regulate the air valves, the heater or both.

If desired, a number of tray-like receptacles may be connected in series, e. g. one above the other, and the jackets may be provided with baffles for assisting the distribution of the temperature-regulating medium.

There may further be provided in conjunction with apparatus of the type described above means for subjecting the seeds and plants to the influence of one or more radiations of specific wave-length and in one application of this form of the invention the seeds and plants are exposed to white light e. g. to daylight from which radiations of certain wave-length have been removed.

In order to maintain the temperature at the optimum, the sides of the apparatus are preferably lagged with a heat-insulating material and this may consist of wood or other fibrous composition associated with a metal backing.

In order to facilitate the removal of trays from the apparatus, certain of the sides are constituted by hinged doors and if desired certain or all the remaining sides may be detached from a supporting framework.

It is within the scope of the present invention to replace some or all of the opaque walls of the apparatus by glass or other transparent material and to provide means for the admission and withdrawal of air or other gas.

Following are descriptions by way of example and with reference to the accompanying drawing of apparatus constructed in accordance with the present invention.

In the drawing:

Figure 1 is a perspective view of one form of apparatus for raising plants from seed in a series of trays.

Figure 2 is a diagrammatic view of one arrangement of piping for filling and emptying the trays.

Figure 3 shows details of another arrangement of piping for admitting liquid to and draining liquid from the trays, and Figure 4 is a diagrammatic view of a further arrangement for filling and emptying the trays.

Example I

Apparatus for growing seeds with or without soil may consist of a metal framework adapted to take 3 receptacles to contain feeding liquid (see Figure 1) the receptacles, 11, 12 and 13 being arranged one above the other and spaced about 40 cms. apart. The framework is provided with sides 14 comprising metal sheets having a heat insulating layer 15 secured thereto; hinged doors 16 and 17 are also provided on certain of the sides of the framework, and these have suitably disposed glass peep holes 18, 19 and 20. Each of the receptacles 11, 12 and 13 contains a tray 111, 112 and 113 having a perforated bottom 114, 115, 116, e. g. of perforated metal, the perforations being of such a size as to retain seeds placed thereon.

At the top of the apparatus there is provided a storage tank 117 for feeding liquid and this is connected by a pipe 118 and suitable fittings to each of the receptacles 11, 12, 13. Means for draining liquid from the receptacles is also provided.

Each of the trays is first covered with a layer of seeds for example of maize, two or three seeds thick, the trays are placed in their respective receptacles and water is admitted to cover the seeds. The temperature is raised to and maintained at between 18 and 24° C. At the end of 18 to 48 hours the water is drawn from the trays and is replaced by a feeding liquid (also at 18 to 24° C.). Under the conditions described germination and growth of the seeds rapidly take place and at the end of a period of 8 to 10 days the plants are 12 to 14 inches high and may be used directly as one of the constituents of a ration for cattle. In one modification of the arrangement of receptacles and piping (shown in Figure 2) each tray is provided with an inlet pipe 21 for liquid and a distributing pipe 121 extending the full width of the receptacle and a similar draw-off pipe 22 and the inlet and draw-off pipes are connected to pipes 122 and 123 through suitable taps 23 and 24. The rising pipe 25 is connected with an overhead storage tank 26 and the falling pipe 123 drains into a sump 27. From the sump 27 the liquid may be returned to the overhead tank 26 by means of a pump 28, the water passing through a heater 29 which raises its temperature e. g. to 18° to 24° C. on its way to the storage tank 26. Each tray is provided as in Figure 3 with a perforated plate 30 for the seeds and such plate may be raised or lowered in its tray by means of rods 130 and eccentrics 131 which are turned by means of handles 132 outside the apparatus. As shown in Figure 3 a single receptacle 133 may contain a number of trays 134 (in this case three).

The liquid may be admitted to or drained from the receptacle 133 via a sump 135 and a connecting pipe 136 which joins a falling pipe 137 having cocks 138 and 139. By the operation of these cocks liquid from the overhead tank may be admitted to the receptacle or may be drawn from the receptacle.

Example II

When plants are to be raised from seed on a larger scale a house may be constructed with wooden sides and roof and provided on either side with a vertical series of long horizontal trays spaced from 12 to 14 inches apart. Each of these trays contains a row of perforated plates, as shown in Figure 3, for supporting the seeds. These perforated plates are placed side by side and are of such dimensions as to be handled readily when supporting fully grown plants. The plates may conveniently be made of perforated zinc or other non-corrodible metal or of wire gauze. According to a modification shown in Figure 4 each receptacle may be provided with a sump 31 from which a drain pipe 32 leads to the sump of the receptacle below, the sump of the lowermost receptacle draining to a waste tank 33. Each sump is provided with a stopper 34. The receptacles are supplied with the feeding liquid from a single overhead tank 35 and the house is maintained at the ascertained optimum temperature for growth (e. g. 20 to 27° C.) by means of a stove outside the house which supplies hot air to a series of pipes underneath the lowermost trays. The walls of the house are provided on the inner surface with a thin sheet metal lining. Alternatively, the house may be constructed of brick, metal or other suitable material.

I claim:
1. Apparatus for raising plants from seeds which comprises a chamber, the walls whereof are lagged with heat-insulating material, a series of receptacles to contain feeding liquid spaced one above the other and of the order of 30 cms. apart, a storage tank for feeding liquid, a pipe for conducting feeding liquid to the receptacles, a branch connection from said pipe to each of the receptacles and a tap above and below each of said branch connections to enable feeding liquid to be introduced into or withdrawn from the receptacle.

2. Apparatus for raising plants from seeds which comprises a series of receptacles to contain liquid spaced apart one above the other and each provided with a sump, at least one tray removably mounted within each of said receptacles, a perforated bottom to each of said trays to support the seeds and to admit liquid thereto, a chamber surrounding said receptacles and provided with opaque walls so that the seeds may be maintained in darkness, an overhead tank, a pipe for conveying feeding liquid from the overhead tank to the receptacles and means for draining liquid from the receptacles which comprises a pipe communicating from the storage tank to the sump in the uppermost receptacle, a pipe communicating between the sump of this receptacle and the sump of the receptacle next below and means to interrupt the flow of liquid between one receptacle and the receptacle next below.

3. Apparatus for raising plants from seeds which comprises a series of receptacles to contain liquid spaced apart one above the other and each provided with a sump, at least one tray removably mounted within each of said receptacles, a perforated bottom to each of said trays to support the seeds and to admit liquid thereto, a chamber surrounding said receptacles and provided with transparent walls so that the seeds are exposed to light, an overhead storage tank, a pipe for conveying feeding liquid from the overhead tank to the receptacles and means for draining liquid from the receptacles which comprises a pipe communicating from the storage tank to the sump in the uppermost receptacle, a pipe communicating between the sump of this receptacle and the sump of the receptacle next below and means to interrupt the flow of liquid between one receptacle and the receptacle next below.

4. Apparatus for raising plants from seeds which comprises a series of receptacles to contain liquid spaced apart one above the other and each provided with a sump, at least one tray removably mounted within each of said receptacles, a perforated bottom to each of said trays to support the seeds and to admit liquid thereto, a chamber surrounding said receptacles, an overhead tank, a pipe for conveying feeding liquid from the overhead tank to the receptacles and means for draining liquid from the receptacles which comprises a pipe communicating from the storage tank to the sump in the uppermost receptacle, a pipe communicating between the sump of this receptacle and the sump of the receptacle next below and means to interrupt the flow of liquid between one receptacle and the receptacle next below.

THOMAS STIRLING LEE.